March 19, 1968  M. A. ARPAIA  3,373,725
FUEL SUPPLY SYSTEM, CARBURETOR AND METHOD
Filed Sept. 3, 1965  4 Sheets-Sheet 1

FIG. 10a. IDLE (HOT)

FIG. 11a. FULL ACCEL. (HOT)

FIG. 8.

INVENTOR.
MICHAEL A. ARPAIA
BY
ATTORNEY

March 19, 1968  M. A. ARPAIA  3,373,725
FUEL SUPPLY SYSTEM, CARBURETOR AND METHOD
Filed Sept. 3, 1965  4 Sheets-Sheet 2

INVENTOR.
MICHAEL A. ARPAIA
BY
ATTORNEY

March 19, 1968     M. A. ARPAIA     3,373,725

FUEL SUPPLY SYSTEM, CARBURETOR AND METHOD

Filed Sept. 3, 1965     4 Sheets-Sheet 3

INVENTOR.
MICHAEL A. ARPAIA

BY

ATTORNEY

INVENTOR.
MICHAEL A. ARPAIA
BY
ATTORNEY

United States Patent Office 3,373,725
Patented Mar. 19, 1968

3,373,725
FUEL SUPPLY SYSTEM, CARBURETOR
AND METHOD
Michael A. Arpaia, 16530 Chatsworth,
Granada Hills, Calif. 91344
Filed Sept. 3, 1965, Ser. No. 484,959
32 Claims. (Cl. 123—119)

ABSTRACT OF THE DISCLOSURE

This carburetor for internal combustion engines is operable to supply regulated quantities of fuel into regulated quantities of combustion air in accordance with combustion requirements. Hot exhaust gas preheats the combustion and is mixed therewith to modify the fuel-air ratio and mixture to enhance the combustion characteristics. The fuel-air ratio varies over a considerable range and is regulated automatically by intake manifold pressure and engine temperature conditions. Advancement and retardation of ignition occurs automatically in accordance with different engine operating conditions. A single fuel valve is adjustable to control fuel flow over the full operating range of the engine and cuts off all flow when the engine is not operating and opens immediately on engine turnover during a starting operation.

---

This invention relates to fuel supply systems for internal combustion systems and more particularly to an improved apparatus and method for forming and controlling the supply of combustible mixture to an internal combustion engine in accordance with widely varying fuel needs under different operating conditions including cold engine, warm engine, normal operation at widely varying power outputs, fast acceleration, deceleration, and other conditions—all with high efficiency and substantially complete combustion of hydrocarbons associated with engine operation.

The present invention is related to and represents improvements in certain novel concepts outlined in my copending application for U.S. Letters Patent, Ser. No. 174,-608, filed Feb. 20, 1962, now patent number 3,224,425. The present invention represents a simplified arrangement and construction of the components for performing essential carbureting functions. As is true with respect to my co-pending application, the present invention employs a fuel supply port maintained under a positive head of fuel and held closed when the engine is not operating; however, in the present invention, the fuel port preferably remains open to some extent so long as the engine is rotating. In the present fuel supply system a single fuel port suffices to meet all engine needs, including fast and slow idling as well as maximum speed and rapid acceleration requirements.

This supply port and the associated control valve is operatively connected to air flow sensing means operating to proportion the air to the fuel as required to provide the most efficient fuel mixture for widely varying conditions and in response to regulation of the primary and secondary throttle valves. The means for sensing the flow or quantity of air entering the engine intake manifold is located downstream from the throttle valves and certain associated auxiliary inlet ports and is aided by automatic choke means and by manifold pressure sensing means to regulate the position of the fuel valve in a manner to vary the fuel-air ratio automatically and under widely varying conditions of temperature, engine speed, and overall operating requirements for purposes and by means to be described in detail below. The manifold pressure sensing means is characterized by its compactness and the fact that it is mounted on and movable with linkage interconnecting the fuel valve and the air flow sensing means.

Among other features of the invention is the fact that the fuel control port is located directly in the path of the fast flowing primary and idling air passages so as to be subjected to turbulence and thorough mixing with this air while enroute to the intake manifold. The fuel port itself is long and narrow and so positioned that the fuel steam discharges laterally crosswise of the air stream going through the carburetor. The fuel port is maintained flooded at all times with excess fuel being recirculated until needed.

The automatic choke serving to regulate the fuel-air ratio under different conditions is operatively connected with the manifold pressure sensing means and receives heat from the exhaust manifold and more particularly from exhaust gases bled from the exhaust manifold. Both of these automatic sub-components are mounted on and rotate with the air flow sensor. A pressure-sensitive valve associated with the exhaust gas bleed and located downstream from the flow sensing means closes under certain conditions and opens under others and is positioned to be bathed in and swept clean by fast flowing air.

Another important feature of the invention is the provision of means for conducting blow-by gases from the engine crankcase into the carbureting device in a unique manner avoiding the need for a valve in the blow-by passage itself thereby avoiding the risk of clogging by the dirty blow-by gases. Heretofore, such blow-by passages have required that the valve be directly in such passages where fouling frequently results. According to the present invention, the blow-by gases are divided and flow partly into the primary air and partly into the idling air passages.

It has also been found that the position of the spark, either advance or retardation, has a pronounced effect on the completeness of combustion and that, for maximum effectiveness, the position of the spark needs to be changed under different engine operating conditions. The present invention contemplates the provision of a centrifugal spark control operating in conjunction with manifold pressure responsive spark control means to provide optimum utilization of fuel under different operating conditions.

Since the present carbureting system does not utilize the customary venturi to create a low pressure operation to induce a fuel flow through metering orifices, it is not subject to limitations imposed by such prior fuel supply systems. For example, the invention carburetor operates with equal efficiency and effectiveness irrespective of its position relative to the horizontal or whether it is operating inverted or upright or in any other position. A float chamber and the associated float and float valve are entirely eliminated, as are the customary orifices located intermediate these chambers and the venturi. Desirably, the present invention includes a wide mouth air scoop facing into the stream of relative air flow in order that advantage can be taken of the vehicle speed to ram and thereby increase the flow of air into the carburetor. This is an important advantage particularly at higher altitudes and at higher speeds.

Still another feature of the present invention is the provision of means for automatically retarding cutoff of both fuel and air during deceleration in order to provide and maintain controlled burning of fuel during a substantial portion of the deceleration period.

Accordingly, it is a primary object of the present invention to provide a unique and improved carbureting method and apparatus for use on internal combustion engines.

Another object of the invention is the provision of carbureting means operable with uniform efficiency and effectiveness whether upright, inverted or in some other position relative to the horizon.

Another object of the invention is the provision of carbureting means having means operable to provide combustible mixtures of different fuel-air ratios each appropriate to different engine operating conditions.

Another object of the invention is the provision of carburetor air flow sensing means incorporating therewith engine temperature and manifold pressure sensing means operating conjointly to regulate the fuel-air ratio automatically and in a manner to provide the most efficient utilization of the fuel.

Another object of the invention is the provision of carbureting means utilizing a single fuel control valve operating under a continuous head and having operating control connections to means for sensing the intake manifold pressure.

Another object of the invention is the provision of an engine carburetor having a unique fuel flow control valve for accurately metering fuel flow over a wide range from slow idling through maximum flow and maintaining accurate calibration throughout the life of the carburetor.

Another object is the provision of carbureting means having primary and secondary throttle valves operatively interconnected by lost-motion operating means, one of which varies the admission of air through idling and medium speed cruise conditions and the other of which admits additional air at higher speeds.

Another object of the invention is the provision of carbureting means having a pair of throttle valves operatively interconnected and located upstream from an air flow sensing and metering valve operating to sense the varying air flow and to regulate fuel flow as necessary to provide a fuel and air mixture of the desired ratio.

Another object of the invention is the provision of improved carburetor means operating in conjunction with spark regulating means to vary the advance and retardation of the spark under different engine conditions.

Another object of the invention is the provision of means responsive to engine deceleration to regulate closing of the throttle and fuel valves until the engine approaches engine idling and functioning to provide a lean fuel-air mixture adequate to assure burning before being exhausted to the atmosphere.

Another object of the invention is the provision of means for substantially increasing the rate of fuel flow during high-speed operation using the same single fuel port employed for lower speed operations.

Another object of the invention is the provision of a compact manifold pressure sensor movably supported and forming part of the fuel supply regulating means.

Another object is the provision of means for advancing and retarding the spark and operating to advance the spark automatically during engine deceleration and for restoring the spark to a lower predetermined value as the engine approaches idling speed.

Another object is the provision of means for automatically leaning the fuel-air ratio during idling and as the idle warms after a cold start.

These and other more specific objects will appear upon reading the following specification and claims and upon considering in connection therewith the attached drawings to which they relate.

Referring now to the drawings in which a preferred embodiment of the invention is illustrated.

In general

Figure 1:
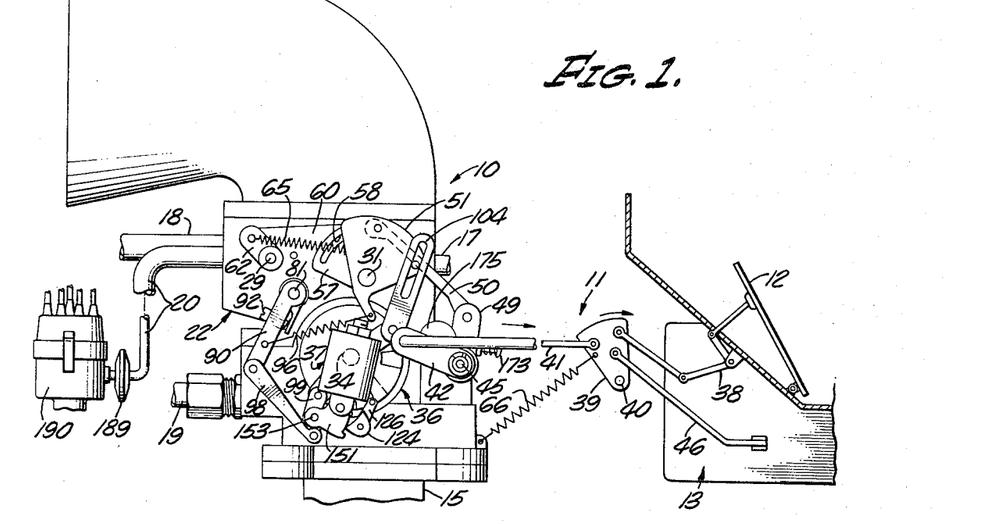
FIGURE 1 is an elevational view, partly in section, showing a preferred embodiment of the invention carbureting apparatus connected to a vehicle accelerator and transmission and having its outlet leading into the engine intake manifold.

Referring more particularly initially to FIGURE 1, there is shown one preferred embodiment of the invention comprising carbureting means 10 connected by linkage 11 to the usual vehicle accelerator pedal 12 and to the vehicle transmission 13. The upper end of the carburetor is here illustrated by way of example with a forwardly facing air intake scoop 14, the discharge end of which opens into the top of the carburetor proper. The lower discharge end of the carburetor opens into the engine intake manifold indicated at 15. The carburetor preferably includes a conduit 17 extending from the top of the vehicle fuel tank (not shown) into the air flow passage interiorly of the carburetor. Another conduit 18 connected to the engine crankcase serves to convey blow-by gases into the primary air passage through a pair of ducts, as will be explained in greater detail presently. Another conduit 19 is connected with the exhaust gas pipe and supplies a limited quantity of hot exhaust gases to operate the automatic choke shown in FIGURE 7 to be described presently. A final connection to carburetor 10 includes a conduit 20 leading from one side of a diaphragm motor of known type forming part of automatic spark retarding and advancing mechanism which, per se, is of conventional type and serving to control the position of the spark in a unique manner according to conditions prevailing interiorly of the invention carburetor.

Figure 4:
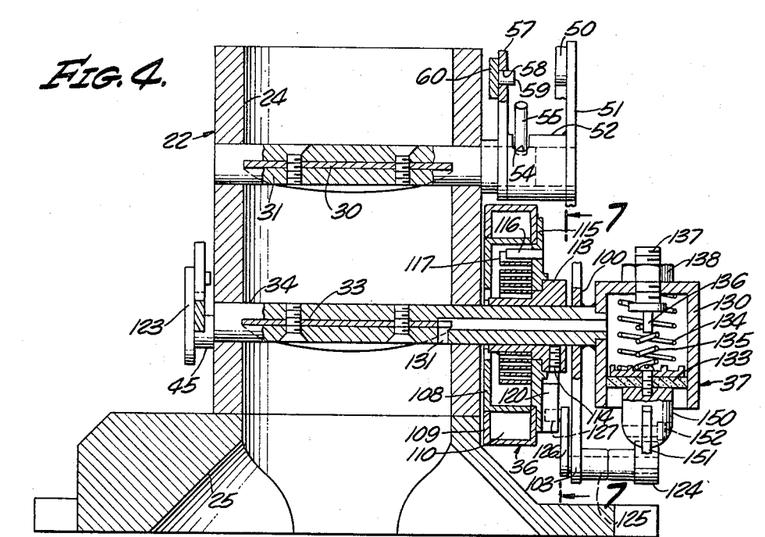
FIGURE 4 is a view similar to FIGURE 3 but taken along line 4—4 on FIGURE 2.
Figure 9:
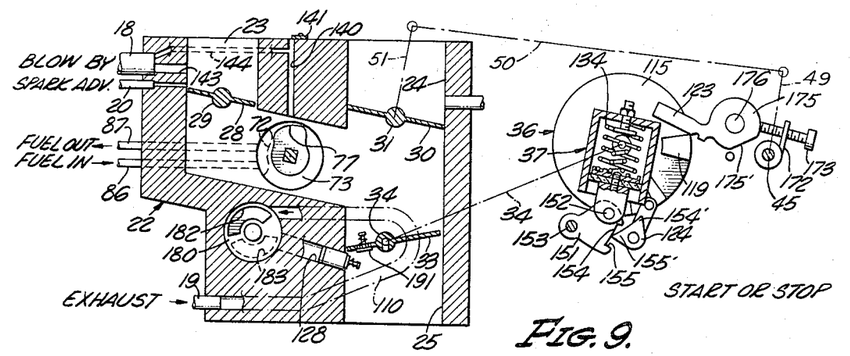
FIGURE 9 is a fragmentary generally schematic view showing the relative positions of certain of the parts while the engine is stopped and with the automatic choke and pressure sensor displaced to the right for greater clarity.

Referring now to FIGURES 1 and 9, it is pointed out that carburetor 10 has a main body 22 formed interiorly thereof with a Y-shaped air passage including a primary air passage 23, a secondary air passage 24, and a downwardly discharging outlet 25 for the fuel and air mixture opening into intake manifold 15. Inlet passage 23 is provided with a primary throttle valve 28 mounted on a shaft 29, and inlet 24 is similarly equipped with a secondary throttle valve 30 mounted on a shaft 31. An air flow sensing valve 33 mounted on shaft 34 extends crosswise of the mixture outlet passage 25 and operates to regulate the single fuel valve as will be explained below. The outer end of shaft 34 is fixed to and supports an automatic choke, indicated generally at 36 as well as a manifold pressure sensing means 37 (FIGURE 4). The individual sub-assemblies and their mode of functioning and operative relationship to one another will now be described separately.

*The accelerator linkage and connections to the throttle valves*

Figure 2:
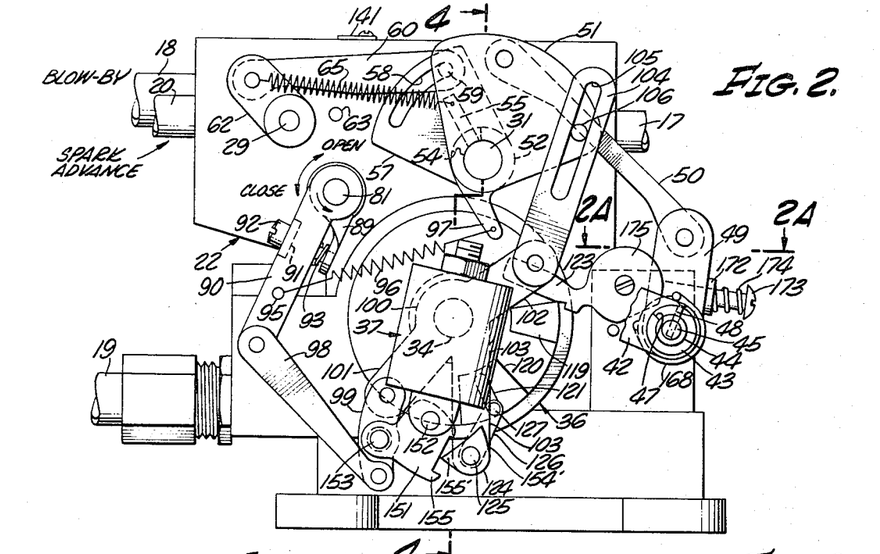
FIGURE 2 is a view on an enlarged scale of the carburetor per se with some parts broken away and showing the relative position of the components with the engine stopped.

Referring to FIGURE 1, it will be understood that accelerator pedal 12 is pivotally mounted on the vehicle floorboard and is suitably connected to the carburetor by linkage means such the bell crank 38 operatively connected to a lever 39 pivotally supported on a shaft 40. Another link 41 is pivotally connected between arm 39 and the outer end of an arm 42 mounted on the carburetor body. Arm 42 has a hub 43 rotatably supported on a second hub 44 (FIGURE 2A) secured to a shaft 45 extending crosswise of and journalled in the carburetor housing. The outer end of hub 43 is notched at 47 and cooperates with the outer end of stop pin 48 to limit lost motion rotation between the two hubs. Normally this lost motion is locked out by a stiff coil spring (FIGURE 2A) encircling hub 43 with one end 169 bearing counterclockwise against arm 42 and the other end 170 bearing clockwise against an arm 49 fixed to the adjacent end of hub 44. Arm 49 projects upwardly as shown in FIGURE 2 and has a pivotal connection with a link 50 having its upper end lying against the inner face and pivoted to a sector 51 fixed to a hub 52 (FIGURE 4) loosely mounted on the outer end of throttle valve shaft 31. Hub 52 has an arcuate slot 54 through which a pin 55 projects from an anchorage in shaft 31. Fixed to the inner end of hub 52 is another sector arm 57 formed with an arcuate slot 58 in which a pin 59 mounted on link 60 freely slides. The other end of link 60 is pivoted to an operating arm 62 fixed to the primary throttle shaft 29. A tension spring 65 has one end connected to the outer end of arm 62 and its other end connected to pin 55 carried by throttle shaft 31. Normally, spring 65 urges throttle 28 closed with pin 59 seated against the upper end of arcuate slot 58 so that throttles 28 and 30 are urged to their closed positions when the engine is not operating.

Before leaving the accelerator linkage, it is pointed out that this mechanism is biased to its normal retracted position by a stiff spring 66 having one end suitably anchored as to the carburetor housing, and other end is connected to the linkage as arm 39. The stiff torsion spring 168 (FIGS. 2, 2A) has one end 169 bearing against the upper edge of arm 42 and its other end 170 lying against the left-hand edge of link 49 and normally effective to hold pin 48 of hub 44 against the right-hand end of notch 47 in hub 43. When the accelerator is fully depressed, the lost motion provided by notch 47 and pin 48 allows arm 42 to rotate independently of arm 49 to permit operation of the high speed passing gear through operating link 46.

Figures 2A, 3:
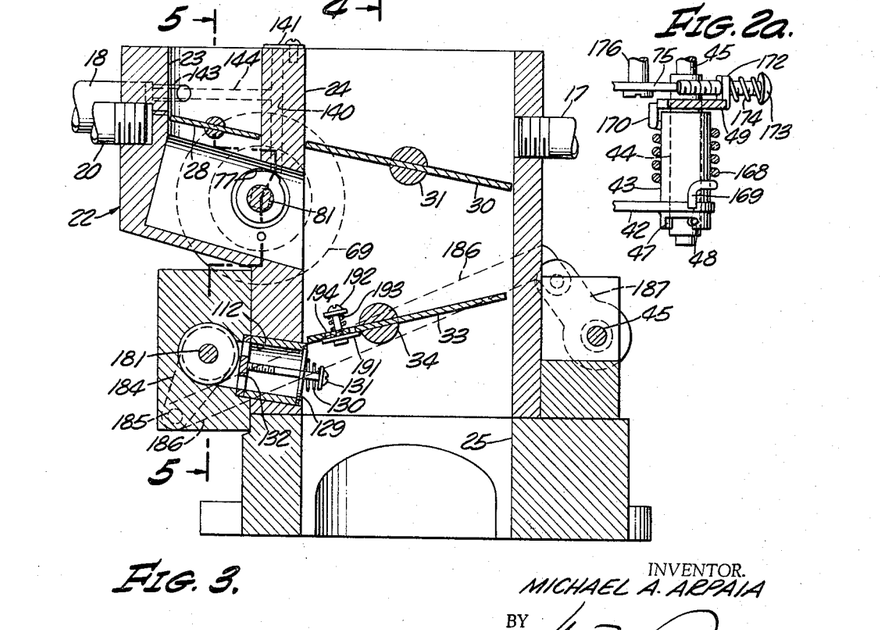
FIGURE 2A is a fragmentary sectional view taken along line 2A—2A on FIGURE 2.
FIGURE 3 is a vertical sectional view taken through FIGURE 2.

As appears from FIGURES 2 and 2A, upright arm 49 is provided with a tang 172 having a threaded opening seating an adjusting screw 173 held in any adjusted position by a compression spring 174. The inner end of screw 173 is positioned to abut the fast idle cam 175 loosely mounted on a shouldered screw 176 mounted in the wall of the carburetor body. Screw 173 is adjustable to vary both the air and the fuel admitted during cold engine and fast idling operation. The details of the idle cam will be described more fully below.

*The fuel metering valve*

Figure 5:
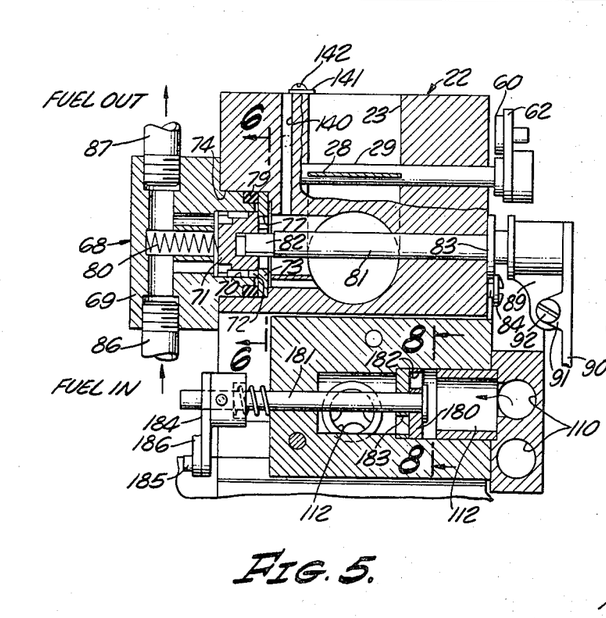
FIGURE 5 is a cross-sectional view taken along the broken line 5—5 on FIGURE 3.
Figure 6:
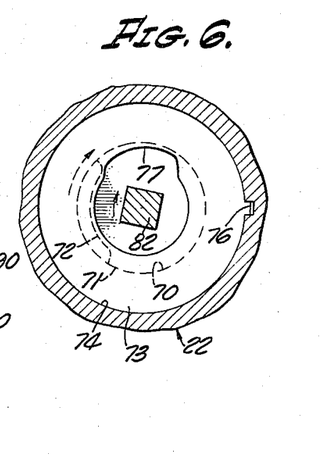
FIGURE 6 is a view of the fuel metering valve on an enlarged scale and taken along line 6—6 on FIGURE 5.

The fuel metering valve assembly is mounted below the primary throttle valve on the rear side of the carburetor, as viewed in FIGURE 1, and includes a main body 69 suitably secured to carburetor body 22 (FIGURE 5). The inner end of body 69 has a cylindrical well 70 rotatably seating a valve spool 71. As is best shown in FIGURE 6, the inner end of valve 71 has an arcuate notch 72 the long edge of which forms part of the precision fuel metering port. Cooperating with arcuate notch 72 is a stationary ring 73 seated against the inner end of a well 74 in carburetor housing 22. Ring 73 may be provided with a keying lug 76 seating in a notch of the well to hold ring 73 against rotation and in a predetermined position. The center of ring 73 is cut away and includes a long accurately-contoured cam-like edge 77 (FIGURE 6) which cooperates with the long edge of notch 72 in forming a high accuracy fuel metering port. According to a preferred design, one edge of the port, as the long edge of notch 72, has a fixed radius of curvature whereas the other edge 77 has a similar but very gradually increasing radius in a clockwise direction. By this expedient it will be recognized that precise and fine regulation of fuel flow can be obtained despite relatively wide range relative movement of the valve ports.

As shown in FIGURE 6, valve 71 is rotated counterclockwise with notch 72 completely out of registry with port edge 77 with the result that the valve is fully closed so that no fuel can flow to the carburetor. A fluid-tight seal is maintained between main body 69 of the valve and the carburetor body by an O-ring 79 (FIGURE 5) held compressed between the inner end of the valve body and port ring 73. Valve 71 is urged seated against the polished face of ring 73 by a light compression spring 80.

Rotation of fuel valve 71 is obtained through a shaft 81 mounted crosswise of the carburetor body with its non-circular inner end 82 firmly seated in a complementally shaped well in valve 71. The outer end of the shaft projects from the carburetor housing and is provided with a collar 83 held loosely against the housing wall by a keeper screw 84.

Fuel is supplied to valve housing 69 by supply pipe 86 and any suitbale pump or the like operable to maintain the interior of the valve housing flooded with fuel. Desirably, the fuel flooding means includes an overflow or return fuel pipe 87 leading to the pump inlet or to the supply tank. A predetermined pressure may be assured by a pressure relief valve associated with the return pipe or the system can be arranged to provide a predetermined fuel head overlying the fuel metering port thereby assuring that the port is flooded and under a positive head at all times.

It is to be understood that notch 72 and cam edge 77 of the valve port are so dimensioned as to provide a very narrow but arcuately long port in the fully open position. The mating faces of the two port members 71, 73 are lapped and have a close smooth sliding fit so maintained by light spring 80. The cooperating port edges are not subject to wear during use except by the fuel stream itself, and, for this reason, the metering accuracy is maintained throughout the life of the engine.

The linkage connecting the fuel valve to the accelerator linkage will now be described, particular reference being had to FIGURES 2, 4 and 5. To this end, there is fixed to the outer end of valve shaft 81, as by a set screw not shown, a hub mounting a radial arm 89. Mounted over the end of shaft 81 and rotatable thereon is a long arm 90 formed with tang 91 having an opening loosely seating an adjusting screw 92. The end of this screw is received in a threaded opening in an arm 89 fixed to shaft 81 and the mid-portions of the screw shank are surrounded by a light compression spring 93. As will be recognized, adjustment of screw 92 provides a fine adjustment of arm 90 about the axis of the valve shaft. Anchored in the outer face of operating arm 90 is a pin 95 forming an anchorage for one end of a light tension spring 96, the other end of this spring being anchored to an arm 97 extending downwardly from sector 51 mounted on secondary throttle shaft 31.

The lower end of arm 90 is also connected, through links 98 and 99, to an arm 101 forming one of the three arms of Y-bracket 100 brazed or otherwise fixed to shaft 34 (FIGURE 4) for the air flow sensing vane 33. A second arm 102 of Y-bracket 100 is pivotally connected to a link 104 extending upwardly therefrom and provided with an elongated slot 105 seating freely over a pin 106 anchored in and projecting from the outer face of sector 51 of the secondary throttle 30.

Automatic choke assembly

Figures 7, 8, 10A, 11A:
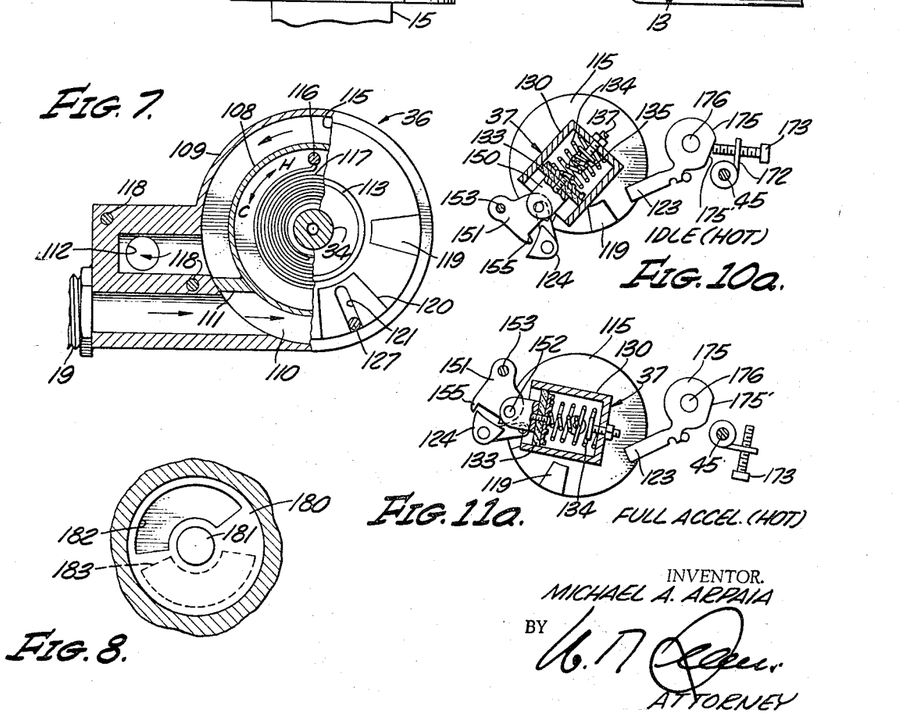
FIGURE 7 is a fragmentary view of the automatic choke showing certain parts broken away and taken generally along line 7—7 on FIGURE 4.
FIGURE 8 is a fragmentary view on an enlarged scale taken along line 8—8 on FIGURE 5.
FIGURE 10A is a fragmentary diagrammatic view of parts of the automatic choke and manifold pressure sensor during slow idle and after a period of normal power operation.
FIGURE 11A is a fragmentary view similar to FIGURE 10A but showing the position of the parts at full acceleration under hot engine conditions.
Figure 11:
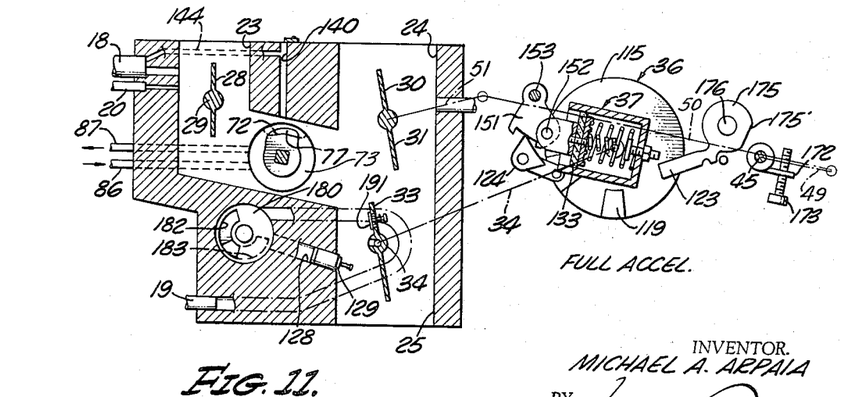
FIGURE 11 is a view similar to FIGURE 9 but showing the relative positions of the parts while the engine is operating under full acceleration.

The automatic choke assembly 36, best shown in FIGURES 4 and 7, has a main housing formed by an inner cup-shaped member 108 surrounded by a generally channel-shaped ring 109 brazed to the flange of the cup member. These two members cooperate to form a flow passage 110 for hot exhaust gases entering from the engine exhaust by way of conduit 19. A partition 111 (FIGURE 7) across this passage causes the hot exhaust gases to pass the full length of channel 110 before discharging through outlet conduit 112. Housing member 108 is suitably mounted against carburetor housing 22 by screws 118 (FIGURE 7). The inner end of bimetal 117 is secured to hub 113 which is secured to shaft 34 by a screw 114 (FIGURE 4). Journalled on hub 113 is a disc 115 supporting an anchor pin 116 to which the outer end of bimetallic thermal element 117 is secured, its inner end being anchored to hub 113. When cold, the thermal member tends to contract counterclockwise, as indicated by the letter "C" in FIGURE 7, whereas, while being heated, its free end expands to the right thereby rotating pin 116 and disc 115 clockwise. The outer face of disc 115 has two bosses 119, 120 (FIGURE 7) and the latter of which has a radial groove 121. One edge of boss 119 underlies and engages the underside of an arm 123 of fast idle cam 175 (FIGURE 2) as the thermostat cools and resets this cam in its fast idle position. As the thermostat heats up after the engine starts, the thermostat rotates disc 115 and boss 119 clockwise allowing the idle cam 175 to rotate counterclockwise to its normal operating position shown in FIGURE 11 the first time the accelerator is depressed.

As is best shown in FIGURES 2 and 4, the lower end of the third arm 103 of Y-bracket 100 carries a generally bell-shaped detent member 124. This member is fixed to a shaft 125 journalled crosswise of the end of bracket arm 103. Projecting radially from inner end of shaft 125 is an arm 126 having a crank pin 127 projecting into groove 121 formed in the face of boss 120 of the automatic choke. It will thus be understood that clockwise or counterclockwise rotation of the automatic choke disc 115 pivots arm 126 and the bell-shaped detent 124 about the axis of shaft 125. Slot 121 permits the crank to move therealong as rotation occurs as dog 124 cooperates with the automatic manifold pressure-sensing device 37, in a manner to be described presently, to vary the richness and leanness of the combustible mixture flowing to the engine.

Manifold pressure-sensing device

The manifold pressure-sensing device 37, best shown in FIGURES 2 and 4, includes a cylinder 130 closed at one end and brazed or otherwise secured to the outer end of the flow sensing valve shaft 34. Cylinder 130 is in communication with a passage 131 extending along shaft 34 and opening through the side thereof to the intake manifold. Piston means 133 reciprocally supported in cylinder 130 is normally urged outwardly by compression spring 134. A smaller compression spring 135 has one end seated against the piston and its upper end slidably supported along the reduced end 136 of a set screw 137 mounted in a threaded opening in the end of cylinder 130 and held locked in any adjusted position by a lock nut 138. Screw 137 has a shoulder on its inner end positioned to provide an abutment or stop for the adjacent end of spring 135 which is attached to the inner end of piston 133. Screw 137 is normally a factory adjustment and engages spring 135 to limit piston retraction under manifold pressures above about 18 inches of vacuum and indicative of engine idling. Under deceleration conditions the manifold pressure is lower than 18 inches thereby causing spring 135 to compress and permitting the fuel flow control linkage to operate to cut down on the fuel flow. Accordingly, it will be understood that by adjusting screw 137 outwardly, greater or even total fuel cut-off during deceleration can be achieved.

FIGURE 10A shows the positions of the choke and of the manifold pressure sensor components during warm engine idling operation. The outer end of piston rod 150 is bifurcated and carries a pivoting detent link 151 held thereto by a pin 152, the other end of this link 151 being pivotally connected to link 99 by a pivot pin 153. The upper end of link 99 is pivoted to the end of arm 101 of Y-bracket 100. Link 151 is provided with an upper tang 154 and a lower tang 155 positioned to engage the respective ones 154' and 155' of detent dog 124, for purposes to be described more fully below in connection with the operation of this invention.

Heater control for automatic choke

Referring now more particularly to FIGURES 1, 3, and 7, it is pointed out that the means for heating automatic choke device 36 comprises conduit 19 and passage 110 serving to conduct hot exhaust gases from the exhaust manifold through the housing enclosing choke thermostat 117. The exiting gases discharge into a passage 112 having a rotary valve 180 and a control shaft 181 (FIGURE 5) extending to the exterior of the carburetor housing. Valve 180 is provided with a port 182 which can be rotated into varying registry with a port 183 in a valve seat member mounted crosswise of passage 112.

To operate this valve there is fixed to the outer end of shaft 181 a bracket arm 184 having a pin 185 pivotally connected to an operating link 186 (FIGURE 5). Link 186 extends across the rear side of the carburetor housing, as viewed in FIGURE 3, and is pivotally connected to a bracket arm 187 anchored to a shaft 45 which rotates during operation of the accelerator linkage. The hot exhaust gases passing through ports 182 and 183 flow through the outlet end of passage 125 which opens into the mixture discharge passage 25 of the carburetor.

The discharge end of passage 112 is provided with an automatic valve disc 129 freely mounted on an adjustable cap screw 131 having its inner end threadedly seated in a spider 132 extending crosswise of passage 112. A light conical compression spring 130 is seated between the head of cap screw 131 and valve disc 129. This spring is effective to hold the valve seated against the end of passage 112 during the starting operation as well as under substantially fully open throttle conditions. At other times, and with manifold pressures lower than about two inches vacuum, the valve disc is more or less open so that hot exhaust gases can encircle through the automatic choke housing provided valve 180 is open.

The automatic means for retarding closing of the flow sensing valve during deceleration It is desirable to avoid rapid closing of the air flow sensing valve 33 during deceleration because insufficient air is admitted for combustion of fuel already present in the engine or enroute to the engine at the beginning of deceleration. A dashpot having a suitable time delay characteristic can be provided for this purpose and connected so as to retard closing of the air supply. However, the simpler and more effective means provided by this invention will now be described with particular reference to FIGURE 3. As there shown, the retarder means comprises a valve disc 191 having a stem 192 extending loosely through an opening in the left-hand or smaller area side of flow sensing vane 33. A light compression spring 193 interposed between the upper end of this valve stem and the upper side of vane 33 serves normally to hold valve 191 closed across ports 194. During deceleration the low manifold pressure then created is effective to open valve 191 thereby upsetting the delicate balance of the flow sensing vane 33. In other words the opening of valve 191 decreases the effective area of the left-hand side of vane 33 permitting the vane to rotate clockwise. This clockwise rotation is limited by the engagement of the upper end of slot 105 in link 104 against pin 106. The opposition to closing of the fuel valve, throttle 28 and vane 33 so provided is effective to decrease the flow of fuel and air to the engine gradually and in a manner to provide efficient combustion of the fuel throughout the deceleration period.

*Idle air and crankcase blow-by facilities*

Referring more particularly to FIGURE 9, it will be understood that approximately one-half of the idling air requirements enter through the primary air passage 23 and flow past throttle 28 even though the throttle is in closed position. The other half of the idling air enters through a passage 140 bypassing throttle 28 and formed in the carburetor body, its upper or inlet end being controlled by a manually adjustable disc valve 141 provided with an appropriate clamping screw 142. Blow-by gases from the crankcase enter the carburetor through a valveless conduit 18 free of obstructions throughout its length and discharging through conduit 18, into the primary air passage 23, in part, through a first outlet passage 143 and in part through a second passage 144 opening into idling air passage 140. As is made clear by FIGURES 3 and 5, the lower end of 140 discharges closely adjacent and across the fuel issuing through the port of gas valve 71.

Since the passages conveying blow-by gases are entirely free of valves or restrictions of any kind they cannot become fouled with hydrocarbons and other debris customarily present in the blow-by gases. Furthermore and significantly, the valveless and restriction-free passages for blow-by gases, due to the unique arrangement of their discharge ends, function automatically to take care of the varying quantities of blow-by under different operating conditions. Thus under starting and idling operation, the relatively small quantity of blow-by is readily entrained by air passing along duct 140 by passing throttle 28. The much greater blow-by produced during deceleration is entrained along blow-by passage 143 by the high velocity air flowing past the end of passage 143 and past the rim of throttle 28 which, as pointed out above, is never fully closed. In this connection it will be recognized that this air flow is occasioned by the low manifold pressure accompanying engine deceleration. And, of course, during cruising operation, blow-by gases are readily entrained through both passages 143 and 144 by air passing through the carburetor and past the ends of these passages. As the engine wears in use, more blow-by is present during engine idling and this is readily drawn into the carburetor by opening adjustment of control valve 141 at the entrance end of idling air duct 140.

*Operation—Starting engine cold*

Assuming that the engine is to be started from a cold condition, it will be understood that the parts are positioned approximately as shown in FIGURES 1 and 3, wherein the primary and secondary throttles 28 and 30 are closed as shown in FIGURES 3 and 9; gas port edges 72, 77 are misaligned and therefore fully closed. and valve 180 controlling the flow of exhaust gases past the automatic choke is closed. Likewise, valves 129 and 133 (FIGURE 3) are closed. Referring to FIGURE 9, it is also pointed out that the high edge of fast idle cam 175 underlies the end of idle adjusting screw 173.

To start the motor, the operator depresses accelerator pedal 12 which shifts the accelerator linkage, as viewed in FIGURE 1, to the left thereby pivoting arms 42, 49 clockwise about shaft 45. As arm 49 moves to the right, it carries link 50 with it thereby pivoting the unitary sectors 51, 57 clockwise. Tension spring 65 now acts to shift primary throttle operating arm 62 to the right because spring 65 keeps pin 59 on link 60 seated at the upper end of arcuate slot 58. After the primary throttle has opened about 45 degrees, further depression of the accelerator pedal causes the left-hand end of notch 54 in hub 52 (interconnecting sectors 51 and 57) to engage pin 55 with the result that pin 55 rotates secondary throttle shaft 31 to open throttle 30.

Figure 10:
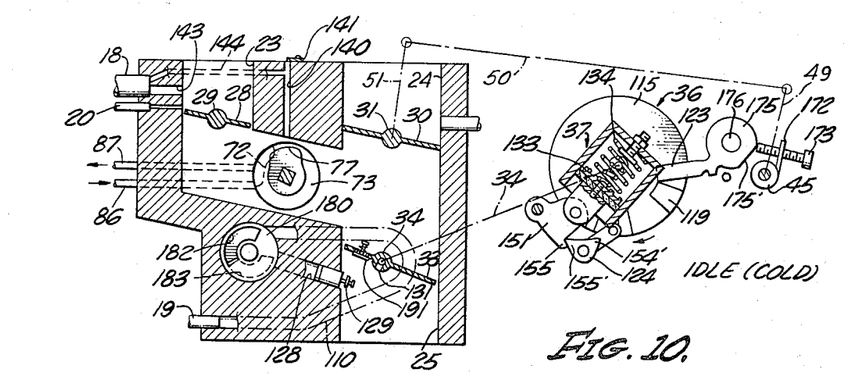
FIGURE 10 is a view similar to FIGURE 9 but showing the relative positions of the parts while the engine is idling under cold conditions.

As this occurs, pin 106 in sector 51 engages the lower end of slot 105 in link 104 causing the latter link to move lengthwise of the link. Since this link is pivoted to upper arm 102 of Y-bracket 100 fixed to the flow sensing shaft 34, this shaft together with the Y-bracket rotates clockwise a slight amount. Rotary movement of Y-bracket 100 operates through links 99, 98 and arm 90 secured to fuel valve shaft 81 to rotate the latter shaft clockwise a slight amount thereby moving the upper end of fuel port notch 72 into small area registry with the cammed port edge 77 of fuel valve 71 (FIGURE 10). The ignition switch being on and the starter circuit for the motor being closed, the engine turns over drawing air through the carburetor along with the fuel admitted through the slightly open fuel valve to provide a rich engine starting mixture.

As soon as the engine starts, the foot may be removed from the accelerator pedal allowing accelerator spring 66 (FIGURE 1) to shift the accelerator linkage to the left.

*Fast idle operation*

The position of the carburetor parts during fast or cold idle operating conditions is generally indicated in FIGURE 10. The engine being in operation, the manifold pressure will be communicated to the interior of the manifold pressure sensing device 37 through passageway 131 (FIGURE 4) in shaft 34. However, piston 133 of the sensing device is prevented from responding fully to the manifold pressure because lower detent 155' of dog 124 is engaged with lug 155 on link 151. This assures that the gas valve will be held open to a slightly greater extent than under warm engine idling conditions. Further assurance of fuel to support fast idling is provided by the fact that the high surface area of idling cam 175 abuts the end of idle screw 173 (FIGURE 9).

Part of the engine idling air enters through passage 23 and around the edge of throttle 28 even though this valve is substantially closed. The remainder of idling air requirements is induced past valve 141 and through passage 140 where it issues downwardly into the fuel issuing from the orifice of valve 71 (FIGURE 5). It is also pointed out that blow-by gases from the engine crankcase are entrained through conduit 18 and into the carburetor. Part of this blow-by gas enters the primary air passage through duct 143 and the remainder passes through passage 144 into passage 140, in the manner clearly shown in FIGURE 9.

As the engine continues to operate at fast idle with an enriched mixture, heat conducted to the automatic choke 36 by hot exhaust gases supplied through conduit 19 and passage 110 heats up thermal element 117. As the bimetal heats, its outer or free end uncoils clockwise (FIGURE 7) thereby rotating ring 115 about hub 113 clockwise. This carries boss 119 on the exterior of the disk clockwise from beneath arm 123 of the fast idle cam. However, this cam will remain in frictional contact with the end of screw 173 until the operator again depresses accelerator 12. As soon as this occurs, and provided the thermostat has heated sufficiently to move boss 119 from beneath arm 123, the fast idle cam will rotate by gravity action against the underlying stop pin with the flat portion 175' of the cam opposite the end of screw 173. It is further pointed out that warming of the thermostat and clockwise rotation of disc 115 rotates detent dog 124 counterclockwise thereby disengaging detent 155' from lug 155. Accordingly, piston 133 of the manifold pressure-sensing device is now free to move upwardly slightly in the cylinder readjusting the connection between the fuel valve and the flow sensing vane. This readjustment is limited by the abutment of inner spring 135 with the stop on the inner end of screw 137, as is best shown in FIGURE 10A. At this time dog 124 is in the position shown in FIGURE 10A with its upper detent 154' spaced below tang 154 as illustrated with the result that a lesser amount of fuel enrichment is available during low vacuum when the engine is hot. The engine now continues to operate at slow idle with a minimum amount of fuel flowing to the engine through the very narrow inlet end of the fuel supply orifice.

The flow of idling air acts on the automatic fuel and air proportioning member 33 holding the latter slightly open, as shown in FIGURE 10.

Excess fuel supplied through conduit 86 returns to the fuel supply through return duct 87 (FIGURE 5) thereby assuring that the chamber rearward of the fuel orifice remains flooded and under a predetermined head.

*Cruising and normal power operation of the engine*

Assuming now that the engine is warm, the operator proceeds to operate it in the usual manner by depressing accelerator 12. This operates to adjust the primary and secondary throttles 28, 30 to admit varying quantities of air to the flow-sensing vane 33. For engine operation at speeds up to 40 to 45 miles per hour, only throttle 28 is operated, secondary throttle 30 remaining closed due to the lost motion connection therebetween described above. Primary air passage 23 is preferably relatively small in cross-section with the result that the air flows therein under appreciable velocity and thoroughly intermixes with the fuel jetted crosswise of this air stream from the fuel metering orifice. This mixture then flows into contact with the flow sensing vane 33 mounted offcenter on its supporting shaft 34, causing this vane to open to an extent accurately coordinated with the flow. This clockwise rotation of sensing vane 33 admits a proportionate quantity of fuel in the manner previously described. In this connection, it is pointed out that the left-hand end of the fuel metering orifice tapers to a point whereas its right-hand end, as viewed in the several figures, is somewhat wider when fully opened. Thus, the fully-opened shape of the orifice is an arcuate wedge and actually much narrower than is indicated in the exaggerated showing in FIGURE 11.

During low and medium cruise operation, the carburetor continues to operate in the manner just described with most of the air requirements being supplied through passage 23 and flowing past the fuel orifice. Blow-by gases are entrained into this primary air supply in the manner described in connection with idle engine operation.

An important feature of this carburetor is the manner in which it operates automatically to provide proportional flow of fuel and air at all times despite wide and sudden manual opening of one or both throttles by depression of the accelerator.

For example, assuming that the engine is operating at say 30 m.p.h. when the operator suddenly and fully depresses the accelerator. This does not result in a sudden increase of either air or fuel flow for the reason that the engine speed does not suddenly increase. However, opening of the throttles does cause the intake manifold pressure to fall, a condition immediately sensed by piston 133 of device 37. Immediately this occurs, the extension of piston 133 enriches the fuel mixture causing the engine speed to increase. This increase in speed draws more air through passage 25, rotating flow sensing vane 33 clockwise and operating the fuel valve linkage to admit a proportional additional amount of fuel. In consequence it will be understood that there is a smooth and high efficiency increase in engine speed and power output despite radical change in the positions of one or both throttles.

It is also pointed out that during the described operation depression of the accelerator rotates shaft 45 clockwise (FIGURE 3) shifting link 186 to the right to rotate the exhaust gas valve 180 to admit a regulated flow of hot exhaust gases around the automatic choke. Normally, the rate of exhaust gas flow is also regulated by the automatic pressure-sensitive valve 129 (FIGURE 3) positioned at the outlet end of the exhaust gas passage 112 and directly in the path of the fast flow mixture passing the rim of vane 33. This serves to keep valve 129 thoroughly clean at all times. Light spring 130 normally holding valve 129 closed responds to the subatmospheric manifold pressure allowing valve 129 to open so that the hot exhaust gases flow into the fuel and air mixture enroute to the engine. During fast acceleration, however, it is undesirable for this valve to be open, screw 131 is so adjusted that spring 130 acts to close valve 129 under full acceleration conditions, the pressure at the lower end of the carburetor air passage then being relatively high.

*Operation above 45 miles per hour*

If the engine operates at cruising speeds above 45 m.p.h., the related depression of the accelerator operates to open secondary throttle 30 while continuing to open primary throttle 28 further. The additional flow of air is sensed by sensing vane 33, opening this vane further clockwise, thereby further opening the fuel valve to supply an appropriate amount of additional fuel for faster cruising to maintain a uniform air-fuel ratio of approximately 14–15 to 1.

As the cruising speed increases, arm 62 of the primary throttle engages stop pin 63 (FIGURE 2) when throttle 28 is fully open. Thereafter, secondary throttle 30 can continue to open as pin 59 of link 60 rides downwardly along slot 58 in sector 57. As the secondary throttle approaches full opening, arm 97 carried by sector 51 (FIGURE 2) rotates clockwise until its lower end carrying spring 96 is above a line interconnecting the axis of gas valve shaft 81 and throttle shaft 31. When this occurs spring 96 is effective to urge the fuel valve to its maximum open position to supply the extra fuel required for high speed operation.

During high speed operation exhaust gas return valve 180 is fully open but the flow of exhaust gases therepast is cut off because valve 129 at the discharge end of duct 112 closes due to the low manifold pressure then existing.

It is also pointed out that during full depression of the accelerator the lost motion connection between the throttle linkage and shaft 45 (FIGURES 1, 2, 2A and 3) comes into operation and permits the final movement of the accelerator linkage to operate link 46 of the transmission 13 to activate the conventional high speed passing gear present in the transmission.

The lost motion connection just referred to is best shown in FIGURE 2A and includes notch 47 in hub 43 and the cooperating pin 48 connecting inner hub 44 to shaft 45. This lost motion connection also includes the stiff spring 68 normally effective to hold pin 48 against the right-hand end of notch 47 with the result that arms 42 and 49 normally operate in unison. As soon as full depression of the accelerator is relieved slightly, spring 68 restores pin 48 against the right-hand end of notch 47 so that thereafter arms 42, 49 and all the parts connected therewith operate as described above.

*Deceleration*

During deceleration the operator normally removes all pressure from the accelerator pedal allowing accelerator spring 66 to urge the parts to their retracted positions quite abruptly. This is undesirable because closing off the air supply can result in considerable quantities of unburned hydrocarbons being exhausted to the atmosphere. An important feature of this invention is the novel and effective means provided for retarding closing of the air supply and permitting sufficient air to enter the engine to combust all fuel. To this end, the low manifold pressure characteristic of deceleration acts to open the sensitive pressure-responsive valve 133 on the left-hand side of metering vane 33 permitting extra quantities of air to flow through ports 136 in the vane. In this connection, it is pointed out that ports 136 may have considerable length parallel to shaft 34 to provide adequate flow area. Opening of valve 133 renders the larger-area portion of vane 33 on the right-hand side of shaft 34 far more effective and responsive to the smaller air flow then occurring through the carburetor. This action holds the primary throttle sufficiently open to maintain at least an extra lean fuel-air mixture which burns to completion and avoids discharge of noxious hydrocarbons to the atmosphere.

*Spark control*

The advance and retarded positions of the spark are most important to high efficiency operation of the engine and more particularly in achieving complete combustion of fuel admitted to the engine under varying operating conditions. The spark adjusting components per se are not illustrated in detail since entirely conventional types well known to the art may be employed. Referring to FIGURE 1, it will be understood that duct 20 opens into a conventional vacuum-operated spark control device 189 mounted along the side of the engine distributor 190. The output shaft of device 189 operates in known manner to supplement the action of a conventional centrifugal type spark advance device housed within distributor 190.

The location of the outlet end of duct 20 relative to throttle 28 is important, it being understood that this end is preferably slightly upstream from the high-side rim of the throttle in the closed position of the latter as is shown in FIGURE 9. The reasons for this will become evident presently.

Preferably the spark advance adjustment is well known to those skilled in this art so as to have a spark advance of 3 to 6 degrees under idling operation. When so adjusted, the spring means customarily employed to oppose the vacuum condition in conduit 20 is so adjusted that, under engine cruising conditions up to 40–45 m.p.h., device 189 advances the spark in the range of 15 to 18 degrees. In other words the vacuum in duct 20 caused by air flowing past the end of this duct advances the spark in this amount. If the engine is operated faster than medium cruising speed, the centrifugal spark advance within the distributor augments the spark advance from 15 to 20 degrees, this increase occurring gradually as engine speed increases.

During deceleration, throttle 28 returns slowly toward closed position despite the low manifold pressure. This pressure condition is sensed by device 189 through the open end of duct 20 and allows the spark advance to decrease to 10 to 12 degrees.

During full acceleration, throttle 28 is fully open and spark advance is only slightly greater than under engine idling and usually in the range of 4 to 8 degrees advance.

If the engine is operating under heavy load within the mentioned speed range, the manifold vacuum is considerably lower, or only about one-third as great, and this results in the spark operating at about 5 degrees advance.

*Typical fuel-air ratios under different operating conditions*

It is found that the invention carbureting device provides the following fuel-air ratios under different representative engine operating conditions. When the engine starts from a cold condition, it is provided with a combustible mixture having a ratio of 10–12 to 1. As the engine warms after starting, this ratio shifts to approximately 14–15 to 1. If a cold engine is accelerated rapidly, the ratio is approximately 12 to 1, whereas fast acceleration of a hot engine is provided with a mixture of about 14 to 1. Normal cruising is achieved with a mixture of 14–15 to 1, whereas deceleration is carried out with a lean mixture of 16–18 to 1 which experience shows complete burning of the fuel.

Variations in the fuel-air ratio between warm and cold engine conditions is achieved, as explained above, through operation of the automatic choke.

While the particular improved fuel supply system, carburetor and method herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. In combination, a carburetor for an internal combustion engine having a main body provided with air passage means opening at its upstream end to a source of air and adapted to discharge a combustible mixture from its downstream end, normally closed throttle means across said air passage means, normally closed flow responsive means across said air passage means, a single normally-closed fuel flow control valve means for supplying full range engine operating requirements having an outlet port opening into said air passage means and having a continuous head of fuel on the upstream side thereof, means operatively interconnecting said fuel control valve means and said air flow responsive means and responsive to air flow past said last mentioned means in response to lowering of the intake manifold pressure below atmospheric pressure to hold said fuel valve means open to supply fuel adequate to supply engine-idling combustible mixture requirements.

2. In combination, a carburetor adapted to have its outlet connected to the intake manifold of an internal combustion engine, said carburetor having air passage means therethrough provided with normally closed throttle means, air flow sensing means for sensing flow along said air passage means under lowering of the pressure downstream therefrom, a single fuel control valve for all engine idling and power requirements maintained flooded with fuel on the upstream side thereof and having its outlet in communication with said air passage means, means operatively connecting said air flow sensing means and said single fuel control valve, biasing means normally holding said fuel valve closed and said air flow sensing means in a predetermined position, and means operatively interconnecting said air flow sensing means and said fuel valve and responsive to lowering of the pressure downstream from said flow sensing means and indicative of engine turnover by a starter to hold the fuel valve open sufficient for engine idling operation.

3. The combination defined in claim 2 characterized in the provision of means operatively connecting said throttle means and said air flow sensing means operable upon opening of said throttle valve means by a predetermined amount to open said fuel valve to admit fuel in advance of and independently of low pressure conditions downstream from said air flow sensing means.

4. The combination defined in claim 3 characterized in that said means interconnecting said throttle means and said air flow sensing means includes lost motion connection means permitting said throttle to open partially and to move to and fro in this partially open position without imparting movement to said fuel valve and being operable when said throttle is opened to a further degree of hold the fuel valve open.

5. The combination defined in claim 3 characterized in that said fuel valve comprises a pair of plate-like valve members in surface contact with one another and relatively movable parallel to one another, said valve members having a pair of long edges cooperating to provide a narrow port which increases gradually in length and relatively slightly in width as said valve members shift relative to one another between the open and closed positions thereof.

6. The combination defined in claim 3 characterized in that said fuel valve comprises a pair of relatively rotatable members having a pair of walls cooperating to form a long narrow flow port, which varies in width and length simultaneously while being regulated in size.

7. The combination defined in claim 2 characterized in the provision of pressure sensing means responsive to pressure conditions on the downstream side of the flow responsive means in said air passage means and operatively connected to said means interconnecting said flow responsive means and said fuel valve and effective to open the fuel valve further and adequately to enrich the fuel mixture at times and to close the valve slightly to lean the fuel mixture at other times.

8. The combination defined in claim 2 characterized in the provision of pressure sensing means responsive to pressure conditions downstream from said flow sensing means and having an operative connection with said fuel valve effective to lean the fuel mixture automatically in response to a pressure condition downstream from said flow sensing means indicative of deceleration of an engine being supplied with a combustible mixture by said carburetor.

9. The combination defined in claim 8 characterized in that said flow responsive means is movably supported crosswise of said air passage, and said pressure sensing means being carried by and bodily movable with said flow responsive means.

10. In combination, a carburetor for connection to the intake manifold of an internal combustion engine, said carburetor having air passage means including separate primary and secondary air supply passages merging in advance of the entrance to the engine intake manifold, first and second throttles located respectively in said primary and secondary air passages, air flow sensing means in said carburetor downstream from said primary air passage, a valve-controlled fuel supply passage opening into said primary air passage and adapted to supply fuel thereto at a pressure above the pressure existing in said air passages under all operating conditions, means for opening said first and second throttles sequentially, means located in said air passage downstream from said first and second throttles and operatively connected to said fuel supply valve, said last named means being responsive to a condition within the outlet portion of said air passage means to regulate said fuel valve, and operating linkage means connected to said first and second throttles and including a lost motion connection to said means responsive to a condition in the outlet portion of said air passage means.

11. A carburetor as defined in claim 10 characterized in that said operating linkage means includes a lost motion connection between said first and second throttles.

12. A carburetor as defined in claim 11 characterized in the provision of means for limiting movement of said first throttle after the same reaches a predetermined open position and permitting said second throttle to move to other more open positions while the first throttle valve remains in said predetermined open position.

13. A carburetor as defined in claim 11 characterized in that said lost motion connection includes biasing means connected between said first and second throttle means and normally effective to hold the lost motion means biased loaded in a predetermined direction and permitting relative movement thereof while said second throttle is in open position.

14. In combination with a carburetor of the type having a positive head fuel supply orifice opening directly into an air supply passage through said carburetor and which orifice includes a normally closed fuel metering valve for supplying engine idling and power requirements, air flow responsive means in said air passage including linkage means connecting the same to said fuel valve operable to regulate the fuel valve as the air flow increases and decreases, manifold pressure sensing means, and means operatively connecting said pressure sensing means to said linkage means whereby said flow responsive means and said manifold pressure sensing means mutally cooperate with one another in adjusting the position of said fuel valve.

15. The combination defined in claim 14 characterized in that said flow responsive means is primarily effective in adjusting the position of said fuel valve in accordance with variations in air flow through said carburetor and in that said manifold pressure sensing means operates selectively to open the fuel valve slightly to enrich the air-fuel mixture under manifold pressure conditions indicative of need for an enriched mixture and to lean the air-fuel mixture during manifold pressure conditions indicative of deceleration operation.

16. The combination defined in claim 14 characterized in the provision of thermal means responsive to ambient temperature conditions and operatively associated with said manifold pressure sensing means and cooperating therewith to limit the response of the last mentioned means to changes in manifold pressure conditions until said thermal means warms from the operating heat of the engine being serviced by said carburetor.

17. The combination defined in claim 15 characterized in that said manifold pressure sensing means is carried by and is bodily movable with said flow responsive means.

18. The combination defined in claim 16 characterized in that said thermal means is bodily movable with said flow responsive means and includes means at the free end thereof effective to limit movement of said pressure sensing means.

19. The combination defined in claim 18 characterized in the provision of means for passing hot exhaust gases in heat exchange with said thermal means and then into the fuel and air mixture downstream from said flow responsive means.

20. The combination defined in claim 19 characterized in the provision of normally-closed pressure operated valve means controlling the flow of hot exhaust gases into said fuel and air mixture and operating to open automatically when the engine is running.

21. The combination defined in claim 16 characterized in the provision of fast idling control means including a fast idle cam member effective to condition said carburetor to admit excess air when said carburetor is cold whereby the slightly increased flow of air past said flow responsive means is effective on the latter to open said fuel valve slightly further, and said thermal means including means to position said fast idle cam means in the fast idling position thereof as said thermal means cools to provide said slightly increased air flow, and said fast idle cam member including means biasing the same to its normal idle position as said thermal means warms after the engine starts.

22. In combination, a carburetor incorporating automatic spark control means to advance and retard the spark in accordance with operating conditions within the carburetor, said carburetor having first and second air inlet passages merging into a common outlet passage, first and second normally-closed throttle valves in respective ones of said inlet passages, flow responsive means downstream from said throttle valves, a fuel valve having an outlet orifice opening into said first passage and including means supplying fuel thereto under a liquid head for forced delivery into said air passage, means operatively connecting said fuel valve and said flow responsive means and operating to open said fuel valve as air flows therepast, separate passage means for admitting part of the engine starting air in a path by-passing said throttle valves as other engine starting air flows past said first throttle valve, vacuum-responsive spark control means in communication with said first air passage closely upstream from the rim of said first throttle valve, throttle linkage means connected to operate said first and second throttle valves in time-delayed sequence, and the opening of said first throttle valve being effective to vary the pressure acting on said vacuum-responsive spark control means automatically as said first throttle valve starts to open.

23. A carbureting device for use in supplying a combustible mixture to the intake manifold of an internal combustion engine, said device having primary and secondary air passages merging into a common mixture outlet passage, separate throttles in each of said primary and secondary passages, air flow sensing means in said mixture outlet passage, a single fuel supply orifice having flow regulating means therefor operatively connected to said air flow sensing means, and operable to keep said fuel orifice open so long as said engine is operating at or above idling speed and to close said fuel orifice when the engine stops.

24. A carbureting device as defined in claim 23 characterized in the provision of manual means for opening said secondary throttle in time delay and following opening of said primary throttle to a predetermined degree and for closing said primary throttle after closing of said secondary throttle.

25. A carbureting device as defined in claim 23 characterized in the provision of means for conducting blow-by gases from the engine crankcase into said carbureting device, said last mentioned means having an outlet end opening into said primary air passage closely upstream from said primary throttle in the closed position thereof.

26. A carbureting device as defined in claim 23 characterized in the provision of means for varying the spark advance for the engine and including vacuum responsive means having a duct terminating in said primary air supply passage closely upstream from said primary throttle when closed whereby opening movement of said primary throttle communicates intake manifold pressure conditions to said spark advance means.

27. A carbureting device as defined in claim 23 characterized in that said air flow sensing means comprises vane means movably supported on a shaft mounted crosswise of said mixture outlet passage, said vane means having a substantially greater area on one side of said shaft than one the other, and pressure responsive means carried by said vane means for varying the relative areas of said vane means on one side of said shaft to retard rotation of said shaft and closing of said fuel metering orifice during deceleration of the engine.

28. A carbureting device as defined in claim 27 characterized in that said shaft supporting said air flow sensing vane also supports means for sensing intake manifold pressure, and means responsive to variations in intake manifold pressure for varying the adjustment of the flow regulating means for said fuel supply orifice.

29. In combination with an internal combustion engine having carbureting means having an air passage equipped with a throttle controlling the flow of air to the engine intake manifold, means for supplying part of the engine idling air requirements by passage means bypassing said throttle, and valveless passage means for conveying blow-by gases from the engine crankcase to the engine along with a combustible fuel mixture supplied by said carbureting means, said valveless passage means having a plurality of discharge ends for blow-by gases one of which opens into said passage means bypassing said throttle and another of which opens into the carburetor air passage adjacent the rim of said throttle when closed whereby low manifold pressures normally existing during deceleration are effective to entrain blow-by gases from the engine crankcase and whereby the flow of idling air through said idle air passage means is effective to entrain blow-by gases during idling.

30. The combination defined in claim 29 characterized in the provision of means in said idling air passage means upstream from the connection of said passage means to the blow-by passage means operable to regulate the quantity of idle air permitted to flow therepast.

31. In combination with carbureting means connected to the intake manifold of an internal combustion engine, throttle means regulatable to vary the combustion air flow to the intake manifold, separate passage means for supplying air to said intake manifold independently of the throttle for said throttle regulated means, means having first and second outlet branches for conveying blow-by gases from the engine crankcase into said carbureting means and characterized in being substantially free of flow obstruction between the ends thereof and having its first outlet branch opening into said separate passage means inwardly from the inlet end thereof and having the second of its outlet branches opening into the combustion air passage slightly upstream from said throttle when the latter is in substantially closed position.

32. That improved method of returning blow-by gases from an engine crankcase to its intake manifold during operation of the engine including idling, full acceleration and deceleration operation thereof and wherein said engine is of the type utilizing a throttle controlled carburetor, said method comprising manually regulating the throttle to vary the flow of fuel and air to the intake manifold, conducting part of engine idling air requirements to the engine along a passage bypassing the carburetor throttle, utilizing idling air flow through said passage to entrain thereinto blow-by gases present in the engine crankcase during idling operation, and utilizing the high velocity flow of air past the substantially closed throttle during engine deceleration to entrain blow-by gases from the engine crankcase during engine deceleration.

References Cited
UNITED STATES PATENTS

| | | |
|---|---|---|
| 1,243,479 | 10/1917 | Ball. |
| 1,883,097 | 10/1932 | Teeter. |
| 2,047,743 | 7/1936 | Moore _____________ 123—119 |
| 2,071,116 | 2/1937 | French _____________ 123—119 |
| 2,189,219 | 2/1940 | Olson _____________ 123—119 |
| 2,665,891 | 1/1954 | Smitley _____________ 123—103 X |
| 2,687,710 | 8/1954 | Rauen _____________ 123—119 |
| 2,785,669 | 3/1957 | Armstrong _____________ 123—119 |
| 2,877,997 | 3/1959 | Kane et al. _____________ 123—97 X |
| 3,224,425 | 12/1965 | Arpaia _____________ 123—122 |
| 1,262,013 | 4/1918 | Callon _____________ 123—198 |
| 1,604,283 | 10/1926 | Handy _____________ 123—103 |
| 2,564,253 | 8/1951 | Fenari _____________ 123—103 |

RALPH D. BLAKESLEE, *Primary Examiner.*